Oct. 10, 1944.           L. H. ROLAND           2,360,016
                        ELECTRODE HOLDER
                      Filed Jan. 25, 1943
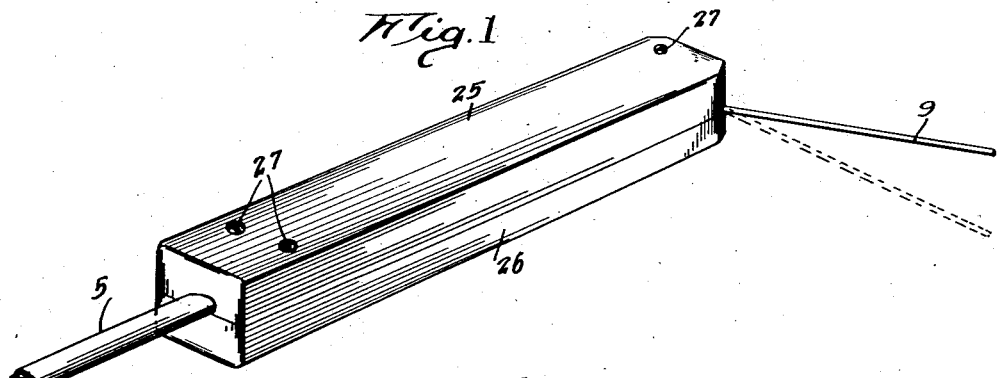
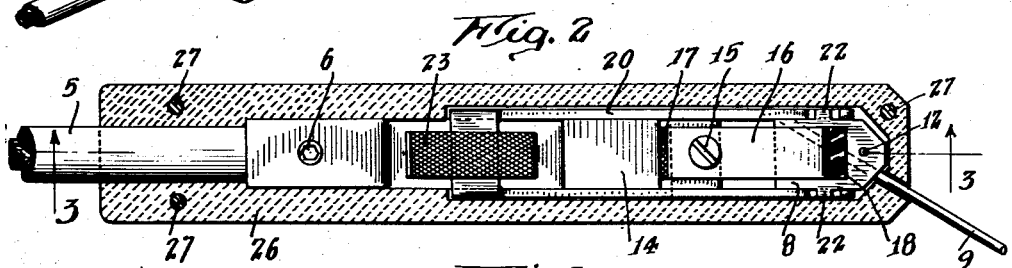
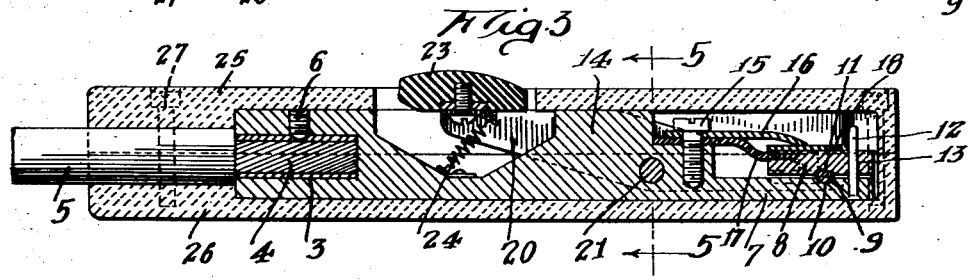
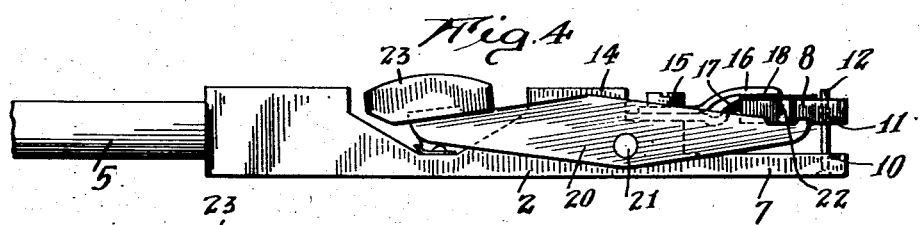
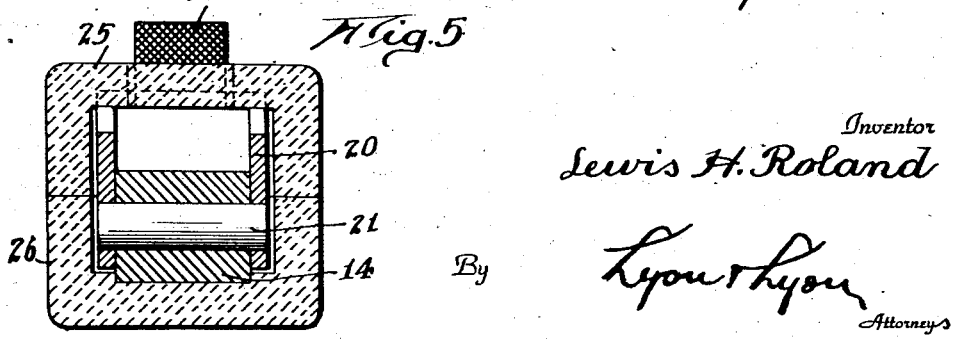
Inventor
Lewis H. Roland
By Lyon & Lyon
Attorneys Patented Oct. 10, 1944

2,360,016

UNITED STATES PATENT OFFICE 2,360,016

ELECTRODE HOLDER

Lewis H. Roland, Inglewood, Calif.

Application January 25, 1943, Serial No. 473,467

5 Claims. (Cl. 219—8)

This invention relates to an electric holder of the type employed in welding operations. The ordinary welding rod holders now in use contain two pivoted jaws for gripping the welding rods. Frequently, these jaws do not make adequate electrical contact with the electrode to be held. Moreover, the jaws which are connected only by a pivot pin frequently in use operate at different potentials, so that the current flow between the jaws results in heating the holder until the jaws become welded together.

It is an object of the present invention to provide an electrode holder in which the jaws are designed to insure a more adequate electrical contact with the electrode to be held, and in which means are provided to assure the jaws being maintained at the same electric potential throughout use of the holder, thereby avoiding any tendency of the jaws to weld together in operation.

More particularly, the electrode holder of the present invention contains two jaw members, designed so that they are capable of assuming parallel relationships at various separations in the jaws. No pivoting movement is provided between the jaws; one jaw being urged towards the other by a leaf spring which is insulated from the electrical circuit of the holder, and a separate flexible wired gauze conductor being provided interconnecting the two jaw members to insure that the two jaw members are maintained at equal electrical potentials. Suitable opening means are provided for the electrode holder, such as a pivoted lever, but the movable jaw is not affixed to the lever.

The electrode holder of the present invention, together with various further advantages of the present invention, will be more fully apparent from the following description in connection with the accompanying drawing of a preferred example of an electrode-holder embodying the invention.

In the drawing:

Figure 1 is a perspective view.

Figure 2 is a plan view in horizontal section.

Figure 3 is a section on the line 3—3 of Figure 2.

Figure 4 is a side elevation of the holder with the casing removed.

Figure 5 is a section on the line 5—5 of Figure 3.

Referring to the drawing, the electrode holder is shown as comprising a lower member 2, the rear end of which is provided with a socket 3 adapted to receive the conductor element 4 of a lead cable 5. A set screw 6 is indicated for holding the conductor 4 in the socket 3. The forward end of the member 2 has the flat jaw portion 7 adapted to cooperate with the movable jaw member 8 in holding an electrode 9. Grooves 10 and 11 may be provided in the jaws for engagement with the electrode 9 at any desired angle.

Guide rod 12 is supported by the lower jaw portion 7 and rises vertically, and the jaw member 8 is provided with suitable vertical bore 13 permitting the guide rod to pass through the upper jaw member loosely. The guide rod 12 confines the upper jaw member to a substantially vertical movement.

To the rear of the jaw portion 7 the member 2 is enlarged, as indicated at 14. A set screw 15 is provided for holding in place both a leaf spring 16 and a gauze conductor 17. The gauze conductor 17 is attached to the movable jaw member 8 by welding, soldering, or the like, so as to insure a potential of the jaw member 8 being maintained the same as that of the jaw portion 7 of the lower member 2. The leaf spring 16 has a free end bearing against an insulating member 18 attached to the upper face of the jaw member 8 and operates to yieldingly maintain the jaw members 7 and 8 in contact with or grip the electrode 9. By the provision of the insulation 18 an electrical current is prevented from passing through the leaf spring 16 and heating and altering the temper of said spring.

By the construction shown, the jaw members 7 and 8 of the electrode holder are capable of gripping the electrode 9 throughout the length of the electrode inserted in the holder, establishing a much improved contact over the contacts now secured by the pivoted type of holders.

In certain cases, it will be found unnecessary to provide the electrode holder with any means for separating the jaws 7 and 8, as such jaws may be separated by forcing the electrode 9 into the opening between the grooves 10 and 11. Preferably, however, the electrode holder is provided with means for separating the jaws preparatory to the insertion of the electrode. For this purpose, levers 20 are provided on each side of the member 2 and pivoted to a pin 21. Said levers extend to the movable jaw member 8 and are shaped to engage extensions 22 of the jaw member for elevating the jaw member upon rocking of the lever 20. The rear of the levers 20 are connected to an operating pad 23, and preferably spring 24 is provided yieldingly urging the rocker to rock in a counter-clockwise direction; the force of the spring 24, however, being insufficient to overcome the force of the leaf spring 16.

The electrode holder also includes a casing consisting of upper and lower casing members 25 and 26, which casing members may be held together by set screws 27. The casing members 25 and 26 may be constructed of any suitable material adapted for both electrical and heat insulation.

While the particular form of the electrode holder herein described is well adapted to carry out the objects of the present invention, it is to be understood that various modifications may be made and that the invention is of the scope set forth in the appended claims.

I claim:

1. An electrode holder, comprising a member having an electrode holding portion, a movable electrode holding member, a leaf spring attached to said first-mentioned member and having its free end slidably contacting and yieldingly urging the movable electrode holding member towards the electrode holding portion of said first member, and means for guiding said movable electrode holding member to move laterally with respect to said electrode holding portion.

2. An electrode holder, comprising a member having an electrode holding portion, a movable electrode holding member, a leaf spring attached to said first-mentioned member and having its free end slidably contacting and yieldingly urging the movable electrode holding member towards the electrode holding portion of said first member, guide means for said movable electrode holding member to prevent relative lengthwise movement between the holding member and holding portion, and a lever for moving said last-mentioned member.

3. An electrode holder, comprising a lower member having an electrode holding portion, a movable electrode holding member, a gauze conductor connecting said movable electrode holding member to said lower member, a leaf spring separate from said movable electrode-holding member yieldingly urging the said members together, and means for guiding the movement of said electrode holding member to permit lateral separation of said member from said electrode-holding portion while said member and said portion remain parallel.

4. An electrode holder, comprising a lower member having an electrode holding portion, a movable electrode holding member, means for guiding said member to move to laterally separate from while maintaining parallel relationship with the electrode holding portion of said lower member, a separate leaf spring yieldingly urging said members together, and means for separating said members.

5. An electrode holder, comprising a lower member having an electrode holding portion, a movable electrode holding member, means for guiding said member to move to separate from while maintaining parallel relationship with the electrode holding portion of said lower member, a separate leaf sprng yieldingly urging said members together, means for separating said members, and a gauze conductor interconnecting said members.

LEWIS H. ROLAND.